Sept. 9, 1958 A. U. BRYANT 2,851,264
METAL CUTTING APPARATUS
Filed June 13, 1955 3 Sheets-Sheet 1
FIG_1_
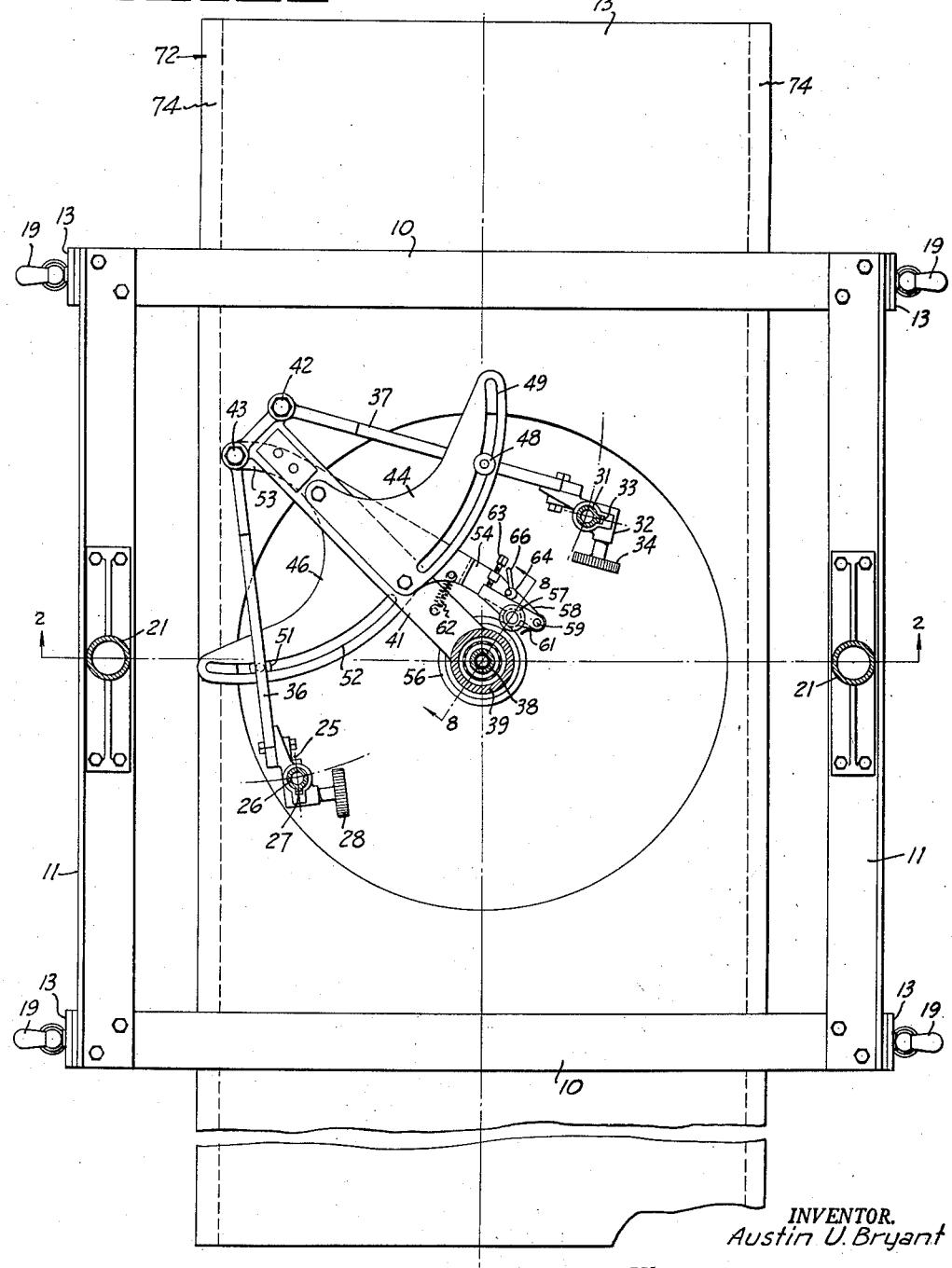
INVENTOR.
Austin U. Bryant
BY
ATTORNEYS Sept. 9, 1958     A. U. BRYANT     2,851,264
METAL CUTTING APPARATUS
Filed June 13, 1955     3 Sheets-Sheet 2
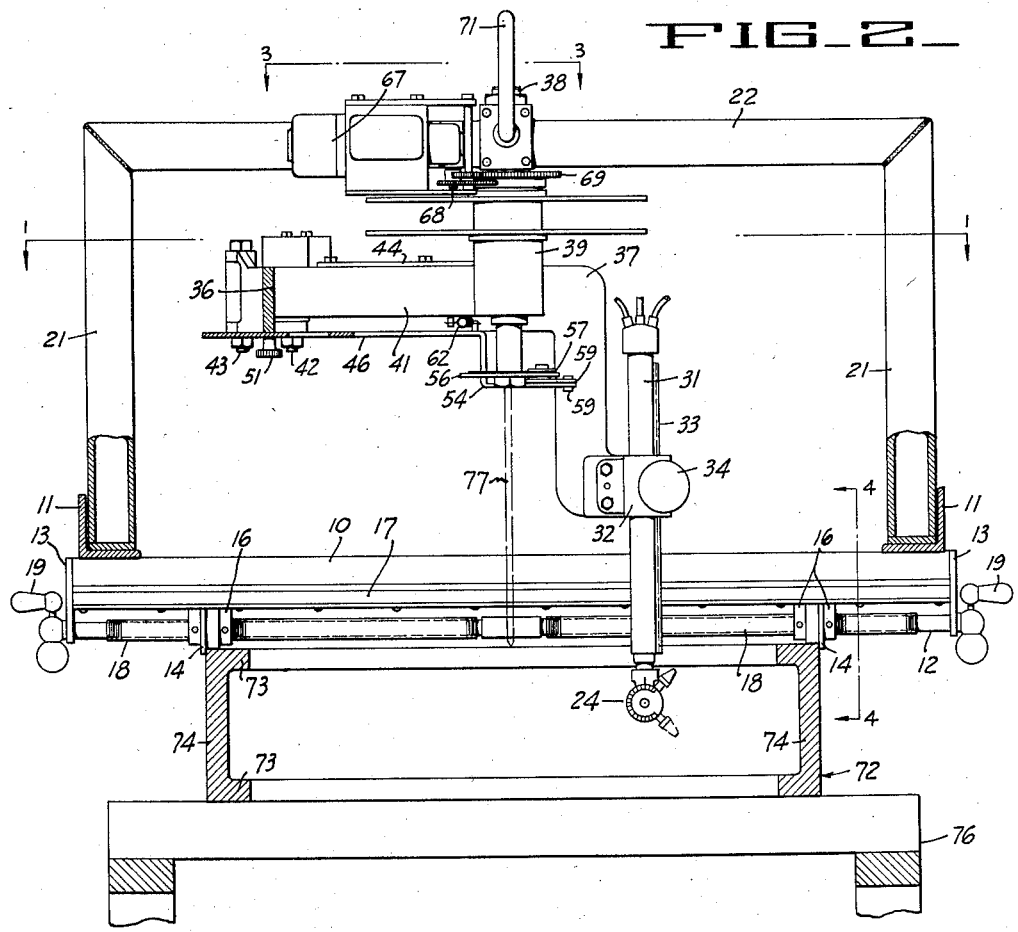
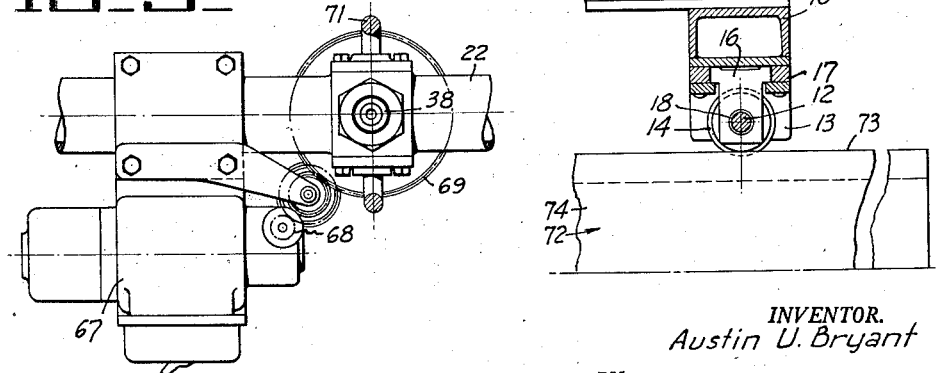
INVENTOR.
Austin U. Bryant
BY
ATTORNEYS Sept. 9, 1958  A. U. BRYANT  2,851,264
METAL CUTTING APPARATUS
Filed June 13, 1955  3 Sheets-Sheet 3
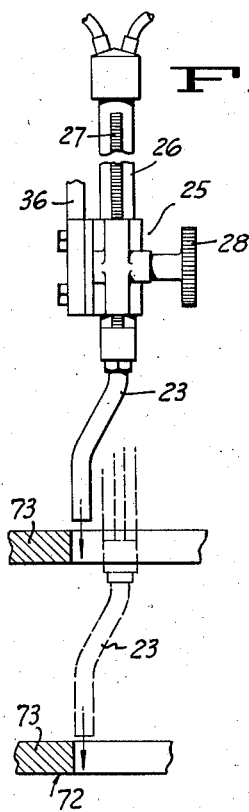
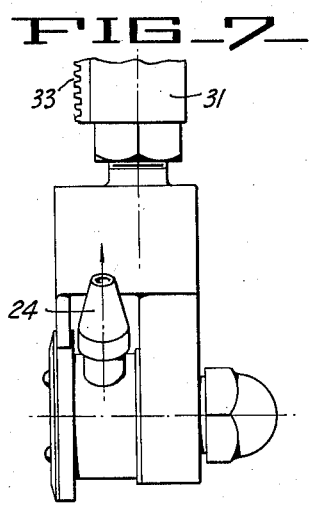
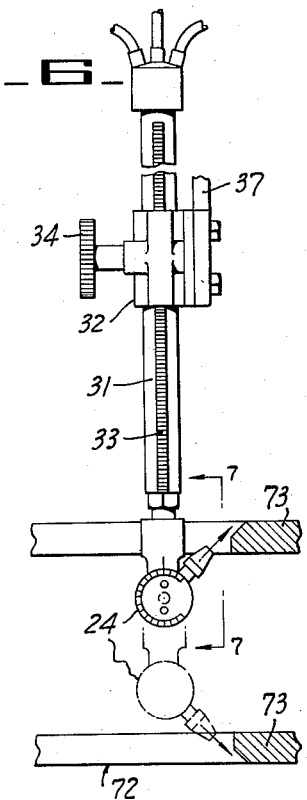
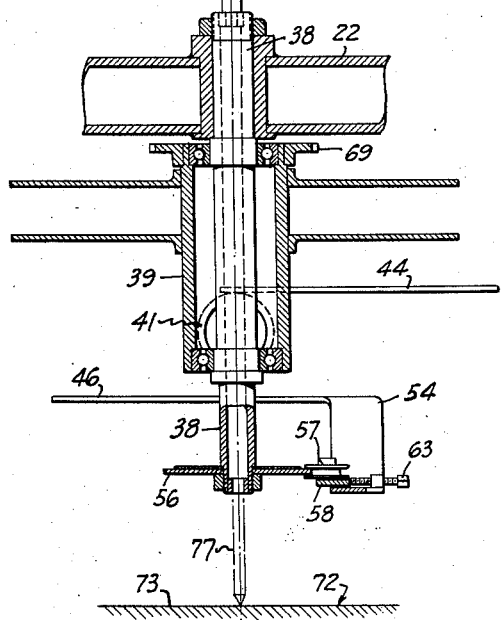
INVENTOR.
Austin U. Bryant
BY
ATTORNEYS United States Patent Office 2,851,264
Patented Sept. 9, 1958

2,851,264

METAL CUTTING APPARATUS

Austin U. Bryant, Walnut Creek, Calif., assignor to Grove Valve and Regulator Company, Oakland, Calif., a corporation of California Application June 13, 1955, Serial No. 514,846

2 Claims. (Cl. 266—23)

This invention relates generally to apparatus for carrying out metal cutting operations by the use of acetylene or like cutting torches. More particularly it pertains to apparatus constructed for carrying out certain cutting operations on valve bodies, preparatory to applying pipe coupling hubs to the same.

In the construction of a fabricated valve of the type disclosed and claimed in my copending application Serial No. 498,253, filed March 31, 1955, a steel body is fabricated from simple structural steel shapes. Aligned openings must be cut in opposite front walls of the body to receive the so-called hubs. Assuming that the hubs are to be welded to the body, it is necessary to bevel the edges of the walls about the peripheries of the openings to facilitate welding operations. It is relatively expensive to form such aligned holes, together with the desired bevelling, by use of conventional machine cutting methods. Particularly when the valves are formed in the larger sizes, the metal machining equipment required must be relatively large and expensive, and the use of such machines requires considerable handling of the heavy bodies.

It is an object of the present invention to provide a machine capable of forming the desired cutting operations described above by the use of oxyacetylene or like cutting torches.

A further object of the invention is to provide a machine of the above character capable of carrying out both the hole cutting and bevelling operations.

Another object of the invention is to provide a machine of the above character which will make possible the cutting of both holes in the two sides of the body in successive operations, without changing the location of the apparatus on one side of the body.

Another object of the invention is to provide apparatus of the above character which can be adjusted to valve bodies of various sizes.

Another object of the invention is to provide apparatus of the above character which can be manipulated to start a cutting operation at a point located inwardly of the desired cutting line, with subsequent accurate tracking of the torch on the cutting line desired.

Additional objects and features of the invention will appear from the following description in which the preferred embodiment has been set forth in detail in conjunction with the accompanying drawing.

Referring to the drawing:

Figure 1 is a sectional view taken on the line 1—1 of Figure 2 and illustrating apparatus incorporating the present invention applied to a valve body for hole cutting and bevelling operations as previously described;

Figure 2 is a side elevational view partly in cross section of the machine shown in Figure 1;

Figure 3 is a detail on an enlarged scale taken along the line 3—3 of Figure 2;

Figure 4 is a cross sectional detail on an enlarged scale taken along the line 4—4 of Figure 2;

Figure 5 is a detail illustrating hole cutting operations;

Figure 6 is a detail illustrating bevelling operations;

Figure 7 is a detail on an enlarged scale showing the type of nozzle used for bevelling operations; and Figure 8 is a cross sectional detail on an enlarged scale taken along the line 8—8 of Figure 1.

The apparatus as shown in Figures 1 and 2 consists of a frame formed by the rigid cross members 10 attached at their ends to the longitudinal members 11. A rotatable shaft 12 extends below each member 10, and is journaled at its ends to the brackets 13. A pair of flanged rollers 14 are located below each member 10, and each roller is carried by a mounting 16 that is slidably retained by the guide way 17. The mountings 16 have threaded engagement with the oppositely threaded portions 18 of the associated shaft 12. With this arrangement when one of the handles 19 on the ends of each shaft 12 is rotated, the rollers 14 are moved toward or away from each other, to provide a spacing to suit a particular valve body.

The frame member 11 serves to mount the uprights 21 which carry the cross supporting member 22. The member 22 carries various working parts for carrying out the desired cutting and bevelling operations.

All hole cutting operations are carried out by an acetylene torch 23 such as shown in Figure 5. Bevelling operations are carried out by an acetylene cutting torch 24, of the swivel head type, wherein the tip end of the torch can be swung to either one of two positions for bevelling operations. Torch 23 is shown carried by an assembly including the head 25 and the rigid tubular member 26 which is provided with a gear rack 27. The gear rack is engaged by a pinion (not shown) adapted to be rotated by the knob 28. The torch 24 is similarly attached to the rigid tubular member 31 which slidably extends through the head 32. The rack 33 engages the pinion (not shown) within the head that is turned by turning the knob 34. Hose connections are made to the members 26 and 31 to supply the necessary gases to the torches.

The head 25 is carried by means serving to cause the torch to track in a desired substantially circular path. Thus the head 25 is carried by an arm 36 which has upwardly and rearwardly extending portions, and head 32 is similarly carried by the arm 37. Both the arms 36 and 37 are adjustably carried by means serving to rotate the arms about a vertical axis. Thus a vertical shaft 38 is fixed to the cross member 22 and serves to carry the rotatable hub 39. A radially extending arm 41 has its one end secured to hub 39 and its free end is attached to the arms 36 and 37 by the vertical pivotal connections 42 and 43.

In order to maintain a desired adjustment, segmental members 44 and 46 are carried by the arm 41. A clamping screw 48 is threaded into the arm 37 and is accommodated within the arcuate slot 49. By tightening this screw the arm 37 can be fixed to locate its associated bevelling torch a fixed radial distance from the axis of shaft 38. The arm 36 is similarly provided with clamping screw 51 which is accommodated in the arcuate slot 52.

Segment 44 is rigidly attached to the arm 41. The segment 46, instead of being rigidly secured to the arm 41, is provided with an extension 53 which is attached to arm 41 by the pivotal connection 43. Another extension 54 of member 46 is located adjacent the lower end of shaft 38 (Figure 8). Cam means is interposed between extension 54 and shaft 38 to enable the operator to provide a predetermined tracking of the torch, which may not be a true circle. Thus shaft 38 is shown carrying a cam 56 of a desired curvature, and this cam is engaged by a roller 57. Roller 57 is carried by arm 58 (Figure 1) which is provided with the pivotal attachment 59 to the extension 54, and which is urged in a clockwise direction (Figure 1) by the spring 61. Another spring 62 serves to urge the member 46 and its extension 54 in a clockwise direction as viewed in Figure 1 thereby maintaining the roller 57 tracked upon the cam. An adjustable set screw 63 serves as a stop for arm 58, and an adjustment of this screw serves in effect to move the torch inwardly or outwardly of a predetermined tracking path, as desired by the operator.

At the start of a torch cutting operation it is desirable to have the hole cutting torch located inwardly of the desired path of cut. For this purpose, I have provided a small cam 64 which is pivotally attached to the extension 54 and which is provided with the operating finger 66. When this cam is turned in one direction, the arm 58 is rotated a small amount in a counter-clockwise direction as viewed in Figure 1, thus rotating the member 46 in the same direction to move the torch inwardly toward the axis of shaft 38. After the torch has been lit and the cut is started, finger 66 and cam 64 can be manually returned to normal position, thus causing the torch to move outwardly to the desired cutting line.

Suitable means are provided for rotating the hub 39 at a constant speed. In the present instance the rotating means consists of electric motor 67 which is mounted on member 22 and which is connected to the hub 39 through suitable speed reducing gearing. The gearing in this instance includes a gear train within the housing of the motor, together with the first and last gears 68 and 69 of an exposed gear train. Gear 69 is attached to the hub 39.

A ring 71 or like suitable means is provided for engagement by the hook of a hoist, whereby the apparatus can be applied or removed from a valve body as desired.

A valve body 72 has been illustrated in Figures 1 and 2. It consists of front walls 73 that are parallel and which are connected by the side walls 74. These walls can be fabricated from suitable simple structural shapes, such as channels, angles and plates, etc.

The apparatus described above is used in the following manner. The valve body is placed in horizontal position upon the support 76. The apparatus is then lowered to seat the rollers 14 upon the corners of the body, in the manner illustrated in Figure 2. A suitable tool 77 can be inserted in the shaft 38 to enable the operator to accurately align the shaft with the center of the body about which the cut is to be made. The hole cutting torch 23 is now ignited and adjusted to bring its tip to a proper level with respect to the top wall of the valve body. The finger 66 has been operated to cause the torch 23 to assume a position inwardly from the desired line of cut. When the torch penetrates through the metal and is properly cutting, the finger 66 is turned whereby the torch moves outwardly to the line of cut. At the same time the electrical motor 67 is started in operation whereby the torch moves at a predetermined rate along the desired line of cut. During this time the exact path taken by the torch is determined by the contour of the cam 56. In some instances it is desirable to contour this cam to compensate for distortions due to heating and cooling of the body. Thus the cam 56 may be formed to an approximate ellipse with its axis located in such a manner that after the cut has been completed, the hole is circular. Upon completing a cut through the top wall of the body, the cut away metal is removed and the torch 23 then lowered to operate upon the lower wall of the body, in the manner shown in dotted lines in Figure 5. Following the cutting of aligned circular holes in the manner just described, the bevelled cutting torch 24 is lit and adjusted to a position such as shown in Figure 6 for a bevelling operation upon the upper wall. Here again the torch moves at a predetermined constant speed until the bevelling operation has been completed. Following a bevelling operation upon the upper wall, this torch is lowered to the dotted line position shown in Figure 6, and the angle of the tip shifted as indicated for a bevelling operation upon the lower wall.

It will be evident from the foregoing that I have provided a metal cutting machine which can be used to advantage for the successive cutting and bevelling operations required in the manufacture of valves. The apparatus can be readily positioned upon a valve body and adjusted for the desired cutting and bevelling operations, and once adjusted and set in operation, it completes a desired operation automatically. Merely by turning the handles 19, the device can be adjusted to operate upon a variety of valve body sizes.

I claim:

1. In metal torch cutting apparatus for cutting and bevelling holes in valve bodies, a frame adapted to be seated upon one horizontal side of the valve body, a vertical shaft carried by the frame, an arm journaled to said shaft and extending laterally therefrom, a hole cutting torch, a second arm having its one end secured to said torch and its other end pivotally attached to the free end of the first named arm, means serving to fix the angular relation between said arms, a bevelling torch, a third arm having its one end attached to said bevelling torch and its other end pivotally secured to the free end of the first named arm, means serving to adjustably fix the angular relation between the third and first arms, and motive means for rotating said first named arm at a constant angular velocity.

2. In metal cutting apparatus for cutting and bevelling holes in valve bodies, a frame adapted to be seated upon one horizontal side of the valve body, a vertical shaft carried by the frame, a mounting member journaled to said shaft, a hole cutting torch, an arm having its one end secured to said torch and its other end pivotally attached to said member, the point of pivotal attachment being spaced from the axis of the shaft, means serving to fix the angular relation between said arm and said member, a bevelling torch, another arm having its one end attached to said bevelling torch and its other end pivotally secured to said mounting member, said last named pivotal connection being likewise spaced laterally from the axis of the shaft, means serving to adjustably fix the angular relation between said last named arm and said mounting member, and motive means for rotating said member at a constant angular velocity.

References Cited in the file of this patent

UNITED STATES PATENTS

| | | |
|---|---|---|
| 1,698,173 | Royer | Jan. 8, 1929 |
| 2,088,695 | Fausek et al. | Aug. 3, 1937 |
| 2,178,938 | Ohmstede | Nov. 7, 1939 |
| 2,463,408 | Millis | Mar. 1, 1949 |
| 2,468,938 | McLauchlan | May 3, 1949 |
| 2,493,033 | Russell et al. | Jan. 3, 1950 |
| 2,494,532 | Ager | Jan. 17, 1950 |
| 2,508,730 | Stone | May 23, 1950 |
| 2,573,654 | Schrock | Oct. 30, 1951 |

FOREIGN PATENTS

| | | |
|---|---|---|
| 232,264 | Germany | Mar. 10, 1911 |

OTHER REFERENCES

Page 132 of American Machinist of March 5, 1951.